United States Patent
Escobar et al.

(10) Patent No.: US 8,929,108 B2
(45) Date of Patent: Jan. 6, 2015

(54) METHOD AND APPARATUS FOR CONTROLLING A GRID-CONNECTED CONVERTER

(71) Applicant: ABB Research Ltd., Zurich (CH)

(72) Inventors: Gerardo Escobar, Merida (MX); Ngai-Man Ho, Fislisbach (CH); Sami Pettersson, Wettingen (CH)

(73) Assignee: ABB Research Ltd, Zurich (CH)

( * ) Notice: Subject to any disclaimer, the term of this patent is extended or adjusted under 35 U.S.C. 154(b) by 151 days.

(21) Appl. No.: 13/773,174

(22) Filed: Feb. 21, 2013

(65) Prior Publication Data

US 2013/0229839 A1    Sep. 5, 2013

(30) Foreign Application Priority Data

Mar. 2, 2012   (EP) .................................... 12157931

(51) Int. Cl.
| | |
|---|---|
| *H02J 1/10* | (2006.01) |
| *H02M 7/757* | (2006.01) |
| *H02M 1/12* | (2006.01) |
| *H02M 7/539* | (2006.01) |
| *H02M 3/158* | (2006.01) |
| *H02J 3/38* | (2006.01) |
| *H02M 1/00* | (2006.01) |

(52) U.S. Cl.
CPC ............... *H02M 1/12* (2013.01); *H02M 7/539* (2013.01); *H02M 1/126* (2013.01); *H02M 3/1582* (2013.01); *H02J 3/385* (2013.01); *H02M 2001/007* (2013.01); *Y02E 10/58* (2013.01)
USPC .............................................. 363/65; 363/79

(58) Field of Classification Search
USPC .................... 363/39–48, 65, 78–80
See application file for complete search history.

(56) References Cited

U.S. PATENT DOCUMENTS

| | | | | |
|---|---|---|---|---|
| 5,565,761 | A * | 10/1996 | Hwang ........................ 323/222 |
| 2010/0236612 | A1* | 9/2010 | Khajehoddin et al. ........ 136/252 |
| 2011/0103117 | A1* | 5/2011 | Yoneda ........................ 363/132 |
| 2011/0205766 | A1* | 8/2011 | Rodriguez ..................... 363/37 |

(Continued)

FOREIGN PATENT DOCUMENTS

| | | |
|---|---|---|
| DE | 20 2010 007 960 U | 10/2010 |
| EP | 2 270 971 A1 | 1/2011 |

(Continued)

OTHER PUBLICATIONS

European Search Report issued on Nov. 26, 2012.

(Continued)

*Primary Examiner* — Adolf Berhane
*Assistant Examiner* — Gary Nash
(74) *Attorney, Agent, or Firm* — Buchanan Ingersoll & Rooney PC (57) ABSTRACT

A method and an apparatus for controlling a grid-connected converter which includes a boost converter, a buck converter, and a current source inverter having an output CL filter. An input of the buck converter input is connected to an output of the boost converter, and an input of the current source inverter is connected to an output of the buck converter. The method includes controlling a boost converter input voltage, controlling a boost converter output voltage through control of a buck converter output voltage, and controlling the current source inverter to produce an AC current from the buck converter output voltage. The apparatus implements the method.

17 Claims, 6 Drawing Sheets

(56) References Cited

U.S. PATENT DOCUMENTS

| | | | |
|---|---|---|---|
| 2011/0221420 A1* | 9/2011 | Coccia et al. | 323/355 |
| 2011/0228578 A1* | 9/2011 | Serpa et al. | 363/132 |
| 2011/0264288 A1* | 10/2011 | Khajehoddin et al. | 700/287 |
| 2012/0008356 A1 | 1/2012 | Suntio et al. | |
| 2012/0242152 A1* | 9/2012 | Escobar et al. | 307/77 |

FOREIGN PATENT DOCUMENTS

| | | |
|---|---|---|
| EP | 2 354 800 A | 8/2011 |
| EP | 2 362 515 A1 | 8/2011 |
| EP | 2 362 515 A9 | 8/2011 |
| EP | 2 408 097 A1 | 1/2012 |
| EP | 2 408 097 A9 | 1/2012 |
| GB | 2 415 841 A | 1/2006 |
| WO | WO 2008/015298 A1 | 2/2008 |
| WO | WO 2010/130273 A1 | 11/2010 |

OTHER PUBLICATIONS

Michael Lindgren et al., "Control of a voltage-source converter connected to the grid through an LCL filter—Application to active filtering", *Proc. IEEE Power Specialists Conference PESC'98*, Fukuoka, Japan, 1998, pp. 229-235.

Soren Baekhoj-Kajear et al., "Control aspects of an LCL grid-connected green power inverter", *Proc. Nordic Workshop on Pow. and Ind. Electr. NORPIE'02*, Aug. 12-14, 2002, pp. 1-7.

Erika Twining et al., "Grid current regulation of a three-phase voltage source inverter with an LCL input filter", *IEEE Trans. on Power Electr.*, vol. 18(3), May 2003, pp. 888-895.

R. Teodorescu et al., "A new control structure for grid-connected LCL PV inverters with zero steady-state error and selective harmonic compensation", *Proc. IEEE Applied Power Electronics Conference APEC'04*, 2004, vol. 1, pp. 580-586.

A. Papavasiliou et al., "Current control of a voltage source inverter connected to the grid via LCL filter", *Proc. IEEE Power Electronics Specialists Conf. PESC'07*, Jun. 17-21, 2007, pp. 2379-2384.

Leonardo Augusto Serpa et al., "A modified direct power control strategy allowing the connection of three-phase inverters to the grid through LCL filters", *IEEE Trans. on Ind. Appl.*, vol. 43(5), Sep./Oct. 2007, pp. 1388-1400.

Robert Stala, "The switch-mode flying-capacitor DC-DC converters with improved natural balancing", *IEEE Transactions on Industrial Electronics*, vol. 57, No. 4, Apr. 2010, pp. 1369-1382.

Robert Stala et al., "Results of investigation of multicell converters with balancing circuit—Part I", *IEEE Transactions on Industrial Electronics*, vol. 56(7), Jul. 2009, pp. 2610-2619.

Xinbo Ruan et al., "Fundamental considerations of three-level DC-DC converters: topologies, analyses, and control", *IEEE Transactions on Circuits and Systems-I: Regular Papers*, vol. 55, No. 11, Dec. 2008, pp. 3733-3743.

Guillaume Gateau et al., "Multicell converters: active control and observation of flying-capacitor voltages", *IEEE Transactions on Industrial Electronics*, vol. 49, No. 5, Oct. 2002, pp. 998-1008.

\* cited by examiner

METHOD AND APPARATUS FOR CONTROLLING A GRID-CONNECTED CONVERTER

RELATED APPLICATION

This application claims priority under 35 U.S.C. §119 to European Patent Application No. 12157931.2 filed in Europe on Mar. 2, 2012, the entire content of which is hereby incorporated by reference in its entirety.

FIELD

The present disclosure relates to control of single-phase grid-connected converters, and more particularly, to a case where a converter includes DC-DC converters working at a high frequency, in combination with a current source inverter (CSI) operating at the supply fundamental frequency.

BACKGROUND INFORMATION

The present disclosure makes reference to fourteen documents identified in the list of References below. For the sake of brevity, the references are each numerically identified by bracketed numbers (e.g., [1]) in the order in which they are identified in the list of References. The entire disclosures of References [1]-[14] are incorporated herein by reference.

The use of power converters in grid-connected applications has increased in recent years. Renewable energy sources have become a more and more attractive option for producing electrical energy. Instead of larger plants, electrical energy can be produced in a distributed manner using renewable energy sources, such as solar power and wind power, for example. In distributed generation systems, power converters act as an active interface between the power supply and a power grid.

In most cases, electrical energy from photovoltaic panels (PV panels) and wind turbines may have to be converted to a suitable form for consuming it or for feeding it to the grid. The conversion of electrical energy should be carried out with high efficiency so that losses occurring during the conversion are kept minimal. The electrical energy may be converted to alternating voltage having a fixed amplitude and frequency so that the energy can be fed to the grid or consumed directly with appliances that can be operated with the grid voltage.

The power converters may be voltage source inverters (VSI) or current source inverters (CSI) connected to the grid by means of L, LC or LCL passive filter [1]-[8]. Originally, a simple L filter was sufficient, but converters with more complex filter structures are becoming more popular because of their improved characteristics allowing compliance with increasingly more restrictive standards.

Systems with more complex filters, however, also present more complex dynamics. In addition to the increased complexity, an issue of a resonance may arise, which may compromise stability of a system and make the system more susceptible to grid disturbances.

Therefore, more sophisticated controller methods would be beneficial in order to guarantee stability while having an enhanced disturbance rejection capability. In particular, the control schemes may have to be able to attenuate the harmonics distortion. Attenuation of the harmonic distortion has become an almost mandatory feature for controller design. At the same time, it would be desirable to keep the implementation of such controllers as simple as possible and without the requirement of additional sensors in order to keep the implementation cost comparable to known L filter-based converters.

SUMMARY

An exemplary embodiment of the present disclosure provides a method for controlling a grid-connected converter which includes a boost converter, a buck converter, and a current source inverter having an output CL filter. An input of the buck converter is connected to an output of the boost converter, and an input of the current source inverter is connected to an output of the buck converter. The exemplary method includes controlling an input voltage of the boost converter, controlling an output voltage of the boost converter through control of an output voltage (v) of the buck converter, and controlling the current source inverter to produce an AC current from the buck converter output voltage (v). The controlling of the boost converter output voltage includes: determining a power reference (P) on the basis of an input power ($P_{DC}$) of the boost converter and the boost converter output voltage; determining a grid voltage ($v_s$); determining a converter-side current ($i_1$) of the CL filter; forming a damping injection term ($v_{ADI}$) for damping a resonance of the current source inverter by using an active damping injection mechanism; forming a harmonic distortion term ($\hat{\phi}$) for compensating harmonic distortion of the grid voltage by using a harmonic compensation mechanism; determining a control reference (e) on the basis of the power reference (P), the grid voltage ($v_s$), the damping injection term ($v_{ADI}$) and the harmonic distortion term ($\hat{\phi}$); and controlling the buck converter output voltage (v) on the basis of the control reference (e) and the sign of the converter-side current ($i_1$).

An exemplary embodiment of the present disclosure provides an apparatus for controlling a grid-connected converter which includes a boost converter, a buck converter, and a current source inverter having an output CL filter. An input of the buck converter input is connected to an output of the boost converter output, and an input of the current source inverter is connected to an output of the buck converter output. The exemplary apparatus includes means for controlling an input voltage of the boost converter, means for controlling an output voltage of the boost converter through control of an output voltage of the buck converter, and means for controlling the current source inverter to produce an AC current from the buck converter output voltage. The means for controlling the boost converter output voltage: determines a power reference on the basis of at least an input power of the boost converter, and the boost converter output voltage; determines a grid voltage; determines a converter-side current of the CL filter; forms a damping injection term for damping a resonance of the current source inverter by using an active damping injection mechanism; forms a harmonic distortion term for compensating harmonic distortion of the grid voltage by using a harmonic compensation mechanism; determines a control reference on the basis of at least the power reference, the grid voltage, the damping injection term and the harmonic distortion term; and controls the buck converter output voltage on the basis of the control reference and the sign of the converter-side current.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a method and an apparatus which alleviate the aforementioned disadvantages with known configurations. Exemplary embodiments of the present disclosure provide a method and an apparatus for controlling a grid-connected converter.

In accordance with an exemplary embodiment, a converter structure including a boost converter, a buck converter, and a current source inverter having an output CL filter can be used, in order to achieve better operational characteristics. In accordance with an exemplary embodiment, an input of the buck converter input is connected to an output of the boost converter output, and an input of the current source inverter is connected to an output of the buck converter The controller design for the converter structure can be based on a model structure. The information of the dynamical structure of the converter can be incorporated in the controller design in order to allow better dynamical performances. The model can be composed of a boost converter model, a buck converter model, and a model of the current source inverter grid connected by means of the CL filter.

Figure 1:
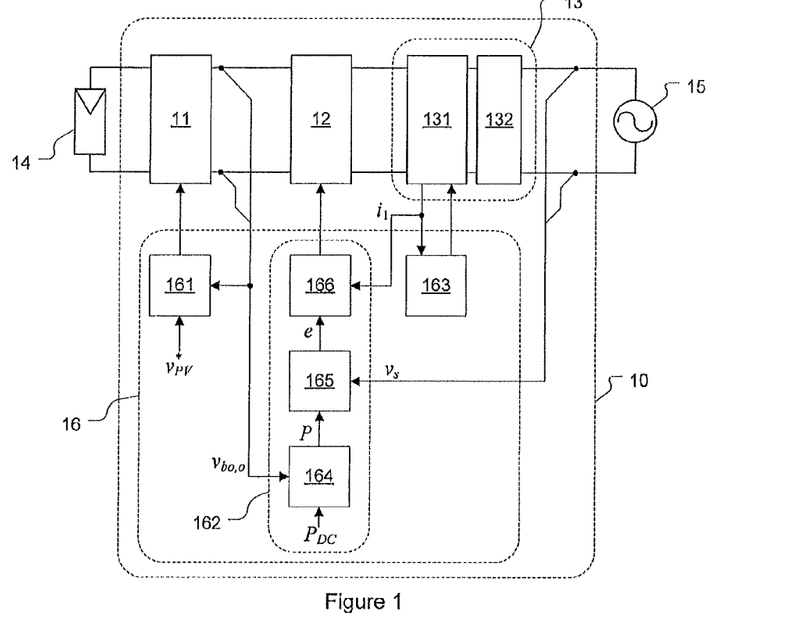
FIG. 1 illustrates a simplified block diagram of a grid-connected converter according to an exemplary embodiment of the present disclosure.

FIG. 1 illustrates a simplified block diagram of an exemplary embodiment of a grid-connected converter 10 including a boost converter 11, a buck converter 12, and a current source inverter 13 having an inverter bridge 131 and an output CL filter 132. A DC power source, such as a photovoltaic (PV) string 14 of FIG. 1, supplies the boost converter 11. An input of the buck converter 12 is connected to an output of the boost converter 11. An input of the current source inverter 13 is connected to an output of the buck converter 12. The current source inverter 13 then supplies current to a grid 15.

The boost converter 11 can be used to produce a DC voltage from the power provided by the power source 14. The buck converter 12 can then be used to create a rectified sinusoidal signal from that voltage. The buck converter 12 can, for instance, use a pulse width modulation (PWM) method to modulate the DC voltage in order to create the rectified sinusoidal signal. The PWM modulation can be based on a rectified sinusoidal reference which can, for instance, be constructed on the basis of the fundamental frequency of the voltage of the grid 15.

The current source inverter 13 can be used to invert the rectified sinusoidal signal into an AC signal. The operation of the current source inverter 13 can be synchronized with the zero crossings of the rectified sinusoidal signal. Thus, the current source inverter 13 may operate at the fundamental supply frequency of the grid 15.

The pulse width modulation can be performed in the DC side by using the buck converter 12 at a higher frequency, while the current source inverter 13, operating at the fundamental frequency, provides the correct sign to the rectified sinusoidal signal. This procedure has the advantage of having reduced switching losses, since switches used in the current source inverter 13 commutate at the fundamental frequency. Since the switching events are synchronized at the zero crossing points of the DC side current, the switching losses of the current source inverter 13 are very low.

There can be several aspects to consider when controlling an arrangement such as the one disclosed above. First, the control scheme may include controlling a boost converter input voltage $v_{PV}$. If, for instance, the power source is a PV string, the control system may have to be able to guarantee regulation of the input voltage towards a reference voltage. The reference voltage may be fixed, for instance, by a suitable maximum power point tracking (MPPT) method.

At the same time, the DC voltage produced by the boost converter 11 may have to be controlled to a level higher than a peak voltage of the grid voltage $v_s$ in order for the converter 10 to be able to supply power to the grid 15. The control scheme may control a boost converter 11 output voltage $v_{bo,o}$ through controlling a buck converter 12 output voltage. In order to allow for better dynamical performance, control of the boost converter output voltage $v_{bo,o}$ may be based on the models of the converter 10 structures, such as models of the buck converter 12 and the current source inverter 13. Information of the dynamical structure is, thus, incorporated in the control scheme. Finally, the control scheme may include controlling the current source inverter 13 to produce an AC current from the buck converter 12 output voltage.

In more detail, controlling the boost converter 11 output voltage $v_{bo,o}$ may, for instance, include determining a power reference P on the basis of, at least, an input power $P_{DC}$ of the boost converter 11 and the boost converter output voltage $v_{bo,o}$. A grid voltage $v_s$ and a converter-side current $i_1$ of the CL filter 132 may also be determined.

A damping injection term for damping a resonance of the current source inverter 13 may be formed by using an active damping injection mechanism. Also, a harmonic distortion term for compensating harmonic distortion of the grid voltage $v_s$ can be formed by using a harmonic compensation mechanism.

A control reference e can then be determined on the basis of at least the power reference P, the grid voltage $v_s$, the damping injection term and the harmonic distortion term.

Finally, the buck converter output voltage can be controlled on the basis of the control reference e and the sign of the converter-side current $i_1$.

In FIG. 1, the converter itself 10 may, for instance, act as an apparatus for implementing the above method. The converter 10 may include means 161 configured to control a boost converter input voltage $v_{PV}$, means 162 configured to control a boost converter output voltage $v_{bo,o}$ through control of a buck converter output voltage, and means 163 configured to control the current source inverter 13 to produce an AC current from the buck converter output voltage. Means 162 configured to control the boost converter output voltage $v_{bo,o}$ may further include means 164 configured to determine a power reference P on the basis of at least an input power $P_{DC}$ of the boost converter 11 and the boost converter output voltage $v_{bo,o}$, means 165 configured to measure a grid voltage $v_S$, and determine a control reference e on the basis of at least the power reference P and the grid voltage $v_S$, and means 166 configured to control the buck converter output voltage on the basis of the control reference e. Means 163 may be configured to control the inverter bridge 131. Means 163 may be synchronized to zero crossings of the converter side current $i_1$.

Different configurations of the converter in FIG. 1 can be generated. The boost converter 11, as well as the buck converter 12, can be a two-level or a three-level converter. Also more than three levels can be used.

Figure 2:
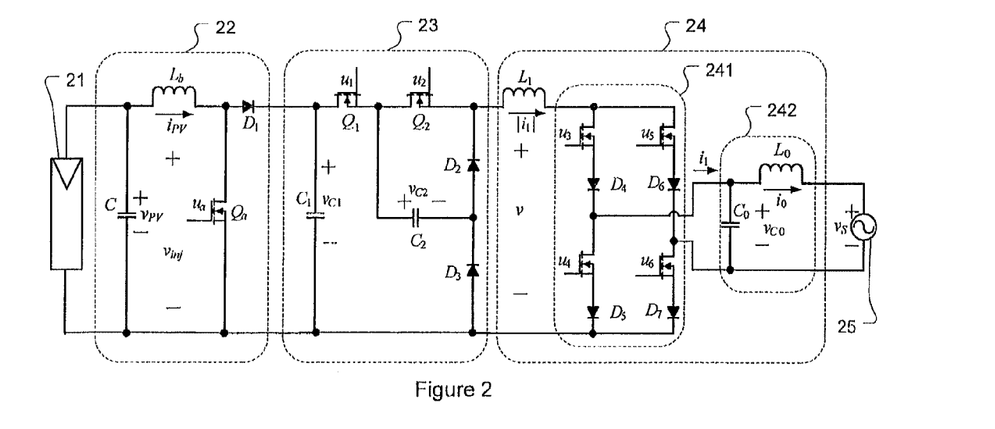
FIG. 2 illustrates a configuration of the converter according to an exemplary embodiment of the present disclosure.

FIG. 2 illustrates an exemplary embodiment of the above described converter. In FIG. 2, a PV string 21 is connected to the input of a two-level boost converter 22. The boost converter 22 includes a boost converter first switching device $Q_a$.

The output of the boost converter 22 is connected to the input of a three-level buck converter 23. In order to produce three voltage levels at its output, the buck converter 23 includes a first capacitor $C_1$, a second capacitor $C_2$, a buck converter first switching device $Q_1$, and a buck converter second switching device $Q_2$. The output of the buck converter 23 is connected to the input of a current source inverter 24.

The current source inverter 24 includes an inverter bridge 241. The current source inverter also includes a CL filter 242 at its output. The output of the current source inverter 24 is connected to a grid 25.

The model and the formulation of the control objectives are presented as follows. Only the dynamics of a boost converter 22 inductor current $i_{PV}$ are considered for a boost converter model. The dynamics can be given by $$L_b \dot{i}_{PV} = v_{PV} - v_{inj},$$

$$v_{inj} = (1 - u_a) v_{C1}, \quad (1)$$

where $0 \leq u_a \leq 1$ represents a duty cycle of the boost converter first switching device $Q_1$, and $v_{inj}$ is a voltage to be injected to the buck converter 23 input. The capacitor C in the boost converter 23 input is assumed to be relatively small, or simply inexistent. Thus, the dynamics of the capacitor C can be neglected.

As it will become clear later, regulation and balancing of voltages $v_{C1}$ and $v_{C2}$ of the capacitors $C_1$ and $C_2$ can be performed by the buck converter 23, while the voltage $v_{PV}$ in the PV string 21 output can be controlled by a suitable maximum power point tracking (MPPT) scheme.

In the exemplary embodiment of FIG. 2, the boost converter 22 operates practically in an open loop, and thus, the dynamics described by Equations (1) can be neglected for control purposes. In fact, it can be shown that these dynamics are stable when the injected voltage $v_{inj}$ is considered as an input and the inductor current $i_{PV}$ as an output. For these reasons, dynamics of both capacitor voltages $v_{C1}$ and $v_{C2}$ are considered to be part of the buck converter 23. These dynamics can be given by $$C_1 \dot{v}_{C1} = (1 - u_a) i_{PV} - u_1 |i_1|,$$

$$C_2 \dot{v} = (u_1 - u_2) |i_1|, \quad (2)$$

where $i_1$ is the converter-side current of the CL filter 242, $u_1$ is a duty cycle of the buck converter first switching device $Q_1$, and $u_2$ is a duty cycle of the buck converter second switching device $Q_2$.

For the grid-connected current source inverter 24, the following model can be used:

$$L_1 \dot{i}_1 = \text{sign}(i_1) v - v_{C0},$$

$$C_0 \dot{v}_{C0} = i_0 - i_1,$$

$$L_0 \dot{i}_0 = v_{C0} - v_s, \quad (3)$$

where $L_1$ is an input inductor to the current source inverter 24, $L_0$ and $C_0$ are the inductor and capacitor of the CL filter 242, $v_{C0}$ is the voltage of the CL filter 242, $i_0$ is a grid-side current of the CL filter 242, and where v represents the buck converter output, for example, the voltage across diodes $D_2$ and $D_3$ and is given by $$v = u_1 v_{C1} - (u_1 - u_2) v_{C2}. \quad (4)$$

In the exemplary embodiment of FIG. 2, the main function of the bridge rectifier 241 is assumed to be rectifying the current $i_r$. The bridge rectifier 241 thus commutates at the frequency of the grid 25, and is synchronized with a reference $i_1^*$ for the current $i_1$.

In the exemplary embodiment of FIG. 2, control objectives of a controller can be guaranteeing regulation of both capacitors voltages towards constant references and a tracking objective of the grid-side current $i_0$ towards a suitable reference $i_0^*$.

A voltage reference $v_{C1}^*$, for capacitor voltage $v_{C1}$ can be selected to be a constant value $v_d$ which exceeds the peak value of the voltage amplitude in the grid 25. The reference for capacitor voltage $v_{C2}$ can be selected to be half of $v_d$, that is, $$v_{C1} \to v_{C1}^* = V_d, \quad v_{C2} \to v_{C2}^* = \frac{V_d}{2}. \quad (5)$$

The grid-side current reference $i_0^*$ is computed as follows $$i_0 \to i_0^* = \frac{P}{v_{S,RMS}^2} \hat{v}_{S,1}, \quad (6)$$

where P is a scalar gain, which is defined subsequently herein, $\hat{v}_{S,1}$ is an estimate of the fundamental wave component of the grid voltage $v_s$, and $v_{S,RMS}$ is the RMS value of the grid voltage $v_s$. If the current $i_0$ follows the reference $i_0^*$, a power factor (PF) close to one can be achieved. The gain P can be used to modulate the amplitude of the grid-side current $i_0$, and has units of power. The value of the gain P approaches the value of a power $P_{DC}$ produced by the PV string 21 and delivered to the grid 25.

To facilitate the controller design, the following transformations can be used:

$$e_1 = u_1 v_{C1}, \quad e_2 = (u_1 - u_2) v_{C2}, \tag{7}$$

$$z_1 = \frac{v_{C1}^2}{2}, \quad z_2 = \frac{v_{C2}^2}{2}. \tag{8}$$

From Equations (7) and (8), the following expressions can be formed:

$$L_1 \dot{i}_1 = \text{sign}(i_1)(e_1 - e_2) - v_{CO}, \tag{9}$$

$$v = e_1 - e_2. \tag{10}$$

Further, the following expressions can be formed for the buck converter:

$$C_1 \dot{z}_1 = v_{inj} i_{PV} - e_1 |i_1|,$$

$$C_2 \dot{z}_2 = e_2 |i_1|, \tag{11}$$

where $v_{inj} = (1 - u_a) v_{C1}$. Adding together the two Equations (11) yields $$C_1 \dot{z}_1 + C_2 \dot{z}_2 = V_{inj} i_{PV} - \text{sign}(i_1)(e_1 - e_2) i_1, \tag{12}$$

where $|i_1| = \text{sing}(i_1) i_1$. The term $\text{sign}(i_1)(e_1 - e_2)$ appears in Equations (9) and (12). Thus, the model can be further simplified by defining:

$$e = \text{sign}(i_1)(e_1 - e_2) = \text{sign}(i_1) v, \tag{13}$$

$$x = z_1 + \frac{C_2}{C_1} z_2. \tag{14}$$

Final expressions of the model (disregarding the boost converter dynamics) are given next. Expressions for the three-level buck converter 23 are:

$$C_2 \dot{z}_2 = e_2 |i_1|,$$

$$C_1 \dot{x} = v_{inj} i_{PV} - e i_1. \tag{15}$$

Expressions for the current source inverter 24 including the CL filter 242 grid are:

$$L_1 \dot{i}_1 = e - v_{CO},$$

$$C_0 \dot{v}_{CO} = i_0 - i_1,$$

$$L_0 \dot{i}_0 = v_{CO} - v_s. \tag{16}$$

The time scale separation principle allows the two subsystems of Equations (15) and (16) to be treated separately, since the dynamics of bulky DC capacitors are usually much slower than the dynamics of a CL filter.

It can now be seen that Equations (16) correspond to a representation of an LCL filter having the voltage e as a control input and the grid voltage $v_s$ as a perturbation. The subsystem represented by Equations (16) coincides with a subsystem in document [13] disclosing a grid controller where the control objective was to guarantee tracking towards a current reference.

In order to fulfil the above mentioned control objective of tracking the grid-side current $i_0$ towards a suitable reference, an approach similar to what was disclosed in Ref. [13] can be used in a current controller subsystem of a controller for the embodiment of FIG. 2. A controller subsystem can be designed to guarantee tracking of the grid-side current $i_0$ towards its reference $i_0^*$ by controlling the buck converter 23 output voltage. The controller subsystem can be referred as an active damping injection and harmonic compensation (ADI+HC) controller. In the exemplary embodiment of FIG. 2, controlling the buck converter output voltage v can be performed on the basis of a control reference e as described in Equation (13). This reference e has first to be determined.

In the controller subsystem, at least one signal in a group of signals of the CL filter 24 including the grid-side current $i_0$, the converter-side current $i_1$, and the capacitor voltage $v_{CO}$ is measured, and estimates of the non-measured signals in the group of signals are formed. In the exemplary embodiment of FIG. 2, for instance, the converter-side current $i_1$ is the only measured signal in the group. The grid-side current $i_0$ and the capacitor voltage $v_C$ are estimated. A reduced order observer (R-OBS), such as in [13], may, for instance, be used for the estimation. The fundamental wave component $\hat{v}_{S,1}$ of the grid voltage $v_s$ is also determined.

Determining the control reference e may then include calculating references for a voltage and currents of the current source inverter 23. A grid-side current reference $i_0^*$ and a converter-side current reference $i_1^*$ for the CL filter can be formed on the basis of the power reference P and the fundamental wave component $v_{S,1}$ of the grid voltage. A capacitor voltage reference $v_{CO}^*$ for the CL filter can be formed on the basis of the fundamental wave component $v_{S,1}$. These references can, for instance, be determined in a following manner:

$$v_{CO}^* \cong \hat{v}_{S,1},$$

$$i_1^* \cong i_0^* + \omega_0 C_0 \hat{\phi}_{S,1},$$

$$i_0^* = P \hat{v}_{S,1} / v_{S,RMS}^2, \tag{17}$$

where $\hat{v}_{S,1}$ is an estimate of the fundamental wave component $v_{S,1}$, and $\hat{\phi}_{S,1}$ is an estimate of a square phase signal (having advancement or delay with respect to the fundamental wave component $v_{S,1}$ by $\pi/2$ rad) of the fundamental wave component.

Figure 3:
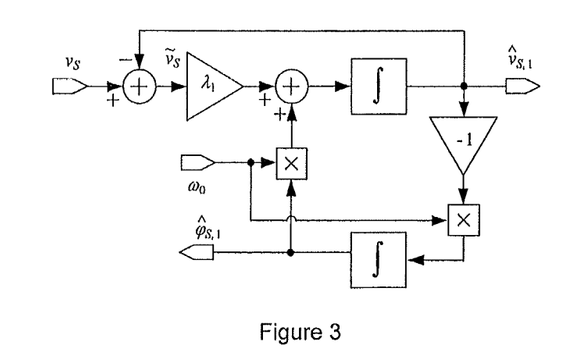
FIG. 3 illustrates a fundamental quadrature signals generator (F-QSG) according to an exemplary embodiment of the present disclosure.

Estimates of the fundamental wave component $\hat{v}_{S,1}$ and its square phase signal $\hat{\phi}_{S,1}$ can be computed by using a PLL scheme like the one proposed in Ref. [14], or simply by using a fundamental quadrature signals generator (F-QSG) as shown in FIG. 3. Operation of the F-QSG in FIG. 3 is disclosed in more detail subsequently herein.

A grid-side current difference term $\tilde{i}_0 (= i_0 - i_0^*)$, a converter-side current difference term $\tilde{i}_1 (= i_1 - i_1^*)$ and a capacitor voltage difference term $\tilde{v}_{CO} (= v_{CO} - v_{CO}^*)$ can be formed from the differences between references and measured/estimated values of the signals.

A damping injection term $v_{ADI}$ can be formed on the basis of the grid-side current difference term $\tilde{i}_0$, the converter-side current difference term $\tilde{i}_1$ and the capacitor voltage difference term $\tilde{v}_{CO}$:

$$v_{ADI} = R_2 \tilde{i}_1 + R_1 \tilde{v}_{CO} + R_0 \tilde{i}_0 \tag{18}$$

$$= R_2 (i_1 - i_0^* - \omega_0 C_0 \hat{\phi}_{S,1}) + R_1 (\hat{v}_{CO} - \hat{v}_{S,1}) + R_0 (\hat{i}_0 - i_0^*),$$

where $\hat{i}_0$ and $\hat{v}_{CO}$ are the estimates of the grid-side current $i_0$ and the CL filter capacitor voltage $v_{CO}$, respectively. $R_0$, $R_1$ and $R_2$ are design parameters used for introducing a damping to guarantee stability. In order to guarantee stability, the control parameters should fulfil the following conditions:

$$\frac{L_0}{L_1}(1 + R_2) > \frac{R_0}{R_1}, \quad R_2 > 0, \; R_1 > 0, \; R_0 + R_1 > 0. \tag{19}$$

An estimate of the harmonic distortion term $\hat{\phi}$ can be formed by using the grid-side current difference term $\tilde{i}_0$. The harmonic distortion term $\hat{\phi}$ can be used for compensating the possible harmonic distortion present in the grid voltage $v_s$. An estimate of the harmonic distortion term $\hat{\phi}$ may include summation of k harmonic components $\hat{\phi}_1$ to $\hat{\phi}_k$. It can, for instance, be built according to the following harmonic compensation mechanism (HCM):

$$\hat{\phi} = \sum_{k \in \{1,3,\ldots\}} \hat{\phi}_k = \sum_{k \in \{1,3,\ldots\}} \frac{\gamma_k s}{s^2 + k^2 \omega_0^2} (\tilde{i}_0 - i_0^*), \quad (20)$$

where $\gamma_k$ is a positive design parameter representing the estimation gain for the k-th harmonic component $\hat{\phi}_k$, where $k \in \{1, 3, 5, \ldots\}$ represents the indices of the harmonics under concern; and where $\omega_0$ represents the fundamental frequency. The set of harmonic indices usually includes the first harmonic component in order to guarantee tracking at the fundamental frequency, and the higher order harmonics of the grid voltage $v_s$ for harmonic rejection. In case the fundamental frequency $\omega_0$ is unknown, an adaptive version can be used, as proposed in [13].

The control reference e can be determined on the basis of the grid voltage $v_s$, the formed damping injection term $v_{ADI}$ and the formed estimate of the harmonic distortion term $\hat{\phi}$. The following expression can, for instance, be written for the controller subsystem:

$$e = v_s - \hat{\phi} - R_2(i_1 - i_0^*) - \omega_0 C_0 \hat{\phi}_{S,1}) - R_1(\hat{v}_{C0} - \hat{v}_{S,1}) - R_0(\tilde{i}_0 - i_0^*). \quad (21)$$

On the basis of Equations (10) and (13), the buck converter output voltage v can finally be controlled on the basis of a control reference e and the sign of the converter-side current $i_1$.

Figure 4:
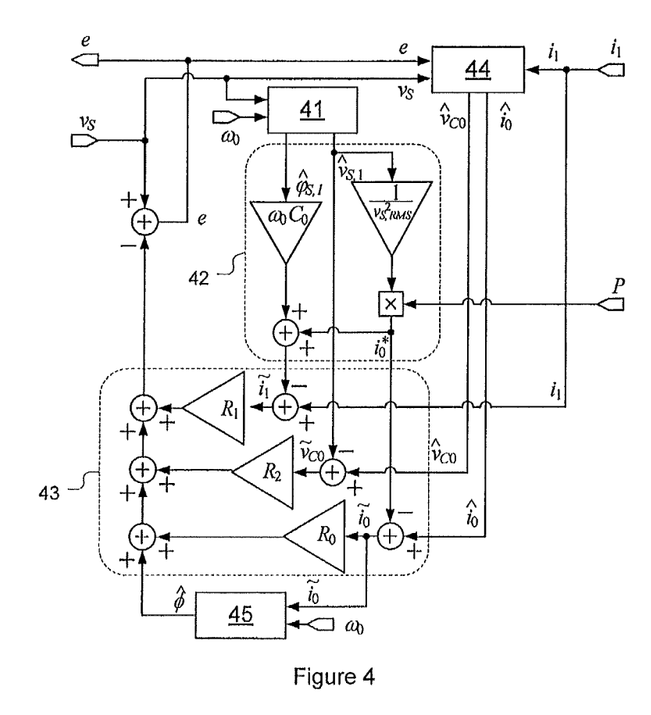
FIG. 4 illustrates a block diagram of an exemplary embodiment of a controller subsystem according to the present disclosure.

FIG. 4 illustrates a block diagram of an exemplary embodiment of the above disclosed controller subsystem. A fundamental quadrature signal generator (F-QSG) 41 is used for producing the fundamental wave component $\hat{v}_{S,1}$ of the grid voltage $v_s$ and the square phase signal $\hat{\phi}_{S,1}$. The fundamental quadrature signal generator 41 can, for instance, be realized using the implementation of FIG. 3, assuming that the fundamental frequency $\omega_0$ of the grid voltage $v_s$ is known.

In FIG. 3, the fundamental wave component $\hat{v}_{S,1}$ of the grid voltage $v_s$ is estimated by first determining a value for a square phase signal $\hat{\phi}_{S,1}$. This can be accomplished by integrating the product of the opposite value of the estimated fundamental wave component of the grid voltage $\hat{v}_{S,1}$ and the fundamental frequency of the grid voltage $\omega_0$. A difference $\tilde{v}_S$ between the grid voltage $v_s$ and the estimated fundamental wave component $\tilde{v}_{S,1}$ of the grid voltage $v_s$ is then determined, and the product of the square phase signal $\hat{\phi}_{S,1}$ and the fundamental frequency $\omega_0$ of the grid voltage $v_s$ is added to the product of the difference $\tilde{v}_S$ and the estimation gain $\lambda_1$. Finally, the value of the estimated fundamental wave component $\hat{v}_{S,1}$ of the grid voltage $v_s$ is determined by integrating the sum of the addition.

In FIG. 4, means 42 are then used for forming a grid-side current reference $i_0^*$ and a converter-side current reference $i_1^*$ for the CL filter on the basis of the power reference and the estimated fundamental wave component $\hat{v}_{S,1}$.

Means 43 are then used for forming the damping injection term. First, a grid-side current difference term $\tilde{i}_0$, a converter-side current difference term $\tilde{i}_1$ and a capacitor voltage difference term $\tilde{v}_{C0}$ are formed from the differences between references and measured/estimated values of the signals. The non-available signals $v_{C0}$ and $i_0$ are replaced by their estimates $\hat{v}_{C0}$ and $\hat{i}_0$, respectively, by using a reduced order observer 44. The replacement of the signals with their estimates is well supported by the separation principle. The damping injection term $v_{ADI}$ is formed on the basis of the grid-side current difference term $\tilde{i}_0$, the converter-side current difference term $\tilde{i}_1$ and the capacitor voltage difference term $\tilde{v}_{C0}$, as disclosed in Equation (18).

The harmonic compensation term $\hat{\phi}$ is implemented by using a harmonics compensation mechanism 45 described in Equation (20).

In order to finally calculate a control reference e, the harmonic compensation term $\hat{\phi}$ and the damping injection term are subtracted from the grid voltage according to Equation (21). The buck converter output voltage v can then be controlled on the basis of the control reference e and the sign of the converter-side current $i_1$ as described in Equation (13).

The other mentioned control objective for the controller in the exemplary embodiment of FIG. 2 is to guarantee regulation of both capacitor voltages towards constant references. For the regulation of the capacitor voltages in the three-level buck converter 23 of FIG. 2, it is assumed that, after an arbitrarily short time, signals on the AC side have already reached their reference values, for example, the current controller subsystem has reached a steady state, and thus, the buck converter 23 model has become $$C_2 \dot{z}_2 = e_2 |i_1|, \quad (22)$$

$$C_1 \dot{x} = v_{inj} i_{PV} - e^* i_1^* = v_{inj} i_{PV} - \frac{P}{v_{S,RMS}^2} \hat{v}_{S,1}^2 + \phi_{2\omega},$$

where $$i_0 = i_0^* = \frac{P}{v_{S,RMS}^2} \hat{v}_{S,1}, \quad (23)$$

$$v_{C0} = v_{C0}^* = \hat{v}_{S,1} + L_0 \dot{\tilde{i}}_0,$$

$$i_1 = i_1^* = C_0 \dot{v}_{C0}^* + \frac{P}{v_{S,RMS}^2} \hat{v}_{S,1},$$

$$e = e^* = L_1 \dot{\tilde{i}}_1 + v_{C0}^*,$$

and $\phi_{2\omega}$ is a term that collects mainly $2^{nd}$ order harmonics.

Since the main interest lies in the DC component of the capacitor voltages, the previous equations can be further reduced to $$C_2 \dot{z}_2 = e_2 |i_1|,$$

$$C_1 \dot{x} = P_{DC} - P, \quad (24)$$

where the higher order harmonics have been neglected, and where $P_{DC} = \langle v_{inj} i_{PV} \rangle_{DC}$, which represents the DC component of the power delivered to the three-level buck converter. The power $P_{DC}$ is similar to the average of the power delivered by the PV panel in the steady state. This term can be treated as an almost constant disturbance for control purposes. P is the gain (amplitude) used for reconstructing the grid-side current reference $i_0^*$.

The objective here is, thus, to design the control inputs $e_2$ and P of the system represented by Equations (24) to guarantee regulation and balance of capacitor voltages.

In terms of these new variables, and based on Equation (5), the objective can be recast as follows:

$$z_2 = \frac{v_{C2}^2}{2} \to z_2^* = \frac{V_d^2}{8}, \quad (25)$$

$$x = z_1 + \frac{C_2}{C_1} z_2 \to x^* = \frac{V_d^2}{2}\left(1 + \frac{C_2}{4C_1}\right),$$

where $$z_1 = \frac{v_{C1}^2}{2} \Rightarrow z_1^* = \frac{V_d^2}{2}.$$

The relationship between the capacitors can be fixed to a ratio of $C_2=0.1 C_1$, and thus $$x = z_1 + \frac{z_2}{10} \Rightarrow x^* = \frac{V_d^2}{2}\left(1 + \frac{1}{40}\right).$$

Moreover, the two expressions in Equations (24) are decoupled, and, thus, separate PI controllers for each of them can be formed as follows:

$$e_2 = k_{p2}\tilde{z}_2 - k_{i2}\tilde{\xi}_2,$$

$$\dot{\xi}_2 = \tilde{z}_2, \quad (26)$$

$$P = k_{p1}\tilde{x} + k_{i1}\tilde{\xi}_1 + P_{DC},$$

$$\dot{\xi}_1 = \tilde{x}, \quad (27)$$

where $\tilde{x} = x - x^*$ and $\tilde{z}_2 = z_2 - z_2^*$, and $k_{p1}', k_{i1}', k_{p2}'$ and $k_{i2}'$ are the positive proportional and integral gains of the two PI controllers.

These controllers can be further reduced to facilitate the implementation as follows:

$$\tilde{x} = x - x^* = z_1 + \frac{C_2}{C_1}z_2 - \left(z_1^* + \frac{C_2}{C_1}z_2^*\right), \quad (28)$$

$$\tilde{x} = (z_1 - z_1^*) + \frac{C_2}{C_1}(z_2 - z_2^*),$$

$$\tilde{x} = \frac{1}{2}(v_{C1} + V_d)(v_{C1} - V_d) + \frac{C_2}{2C_1}\left(v_{C2} + \frac{V_d}{2}\right)\left(v_{C2} - \frac{V_d}{2}\right),$$

$$\tilde{x} \cong V_d(v_{C1} - V_d) + \frac{V_d C_2}{2C_2}\left(v_{C2} - \frac{V_d}{2}\right),$$

$$\tilde{x} \cong V_d\left(\tilde{v}_{C1} + \frac{C_2}{2C_1}\tilde{v}_{C2}\right),$$

where $\tilde{v}_{C1} = v_{C1} - V_d$ and $$\tilde{v}_{C2} = v_{C2} - \frac{V_d}{2};$$

and $v_{C1} + V_d \cong 2V_d$ and $$v_{C2} + \frac{V_d}{2} \cong V_d.$$

Following a similar process for $\tilde{z}_2$:

$$\tilde{z}_2 \cong V_d \tilde{v}_{C2}. \quad (29)$$

These approximations can be directly substituted in the above PI controllers, yielding the following simpler expressions $$e_2 = -k_{p2}\tilde{v}_{C2} - k_{i2}\xi_2, \quad (30)$$

$$\dot{\xi}_2 = \tilde{v}_{C2},$$

$$P = k_{p1}\left(\tilde{v}_{C1} + \frac{C_2}{2C_1}\tilde{v}_{C2}\right) + k_{i1}\xi_1 + P_{DC}, \quad (31)$$

$$\dot{\xi}_1 = \left(\tilde{v}_{C1} + \frac{C_2}{2C_1}\tilde{v}_{C2}\right),$$

where $k_{p1}=V_d k_{p1}', k_{i1}=V_d k_{i1}', k_{p2}=V_d k_{p2}'$ and $k_{i2}=V_d k_{i2}'$ are the new parameters of the PI controllers.

Once the expressions for e and $e_2$ are obtained from Equations (21) and (30), respectively, then $e_1$ can be calculated from Equation (13) as follows $$e_1 = sgn(i_1)e + e_2 \quad (32)$$

Moreover, the duty cycles $u_1$ and $u_2$ for the buck converter switching devices $Q_1$ and $Q_2$ can be reconstructed from Equations (7) as follows:

$$u_1 = \frac{e_1}{v_{C1}}, \quad u_2 = \frac{e_1}{v_{C1}} - \frac{e_2}{v_{C2}}. \quad (33)$$

As mentioned above, the boost converter 22 operates practically in an open loop as its output voltage is controlled by the three-level buck converter 23, while the reference for its input voltage, for example, the reference for the PV voltage $v_{PV}^*$, may be fixed by a suitable MPPT scheme. Thus, by forcing $v_{inj}=v_{PV}^*$ in the $2^{nd}$ expression of Equations (1), the following controller can be used $$u_a = 1 - \frac{v_{PV}^*}{v_{C1}}. \quad (34)$$

The last yields a stable system as shown below. Closing the loop of dynamics of Equations (1) with the controller of Equation (34) yields $$L_b \dot{i}_{PV} = v_{PV} - v_{PV}^* \quad (35)$$

which can also be written as $$L_b \dot{v}_{PV} = \frac{\partial i_{PV}}{\partial v_{PV}}(v_{PV} - v_{PV}^*) \quad (36)$$

where $$\frac{\partial i_{PV}}{\partial v_{PV}} < 0$$

and bounded. The system is stable, and thus $v_{PV} \to v_{PV}^*$.

Figure 5:
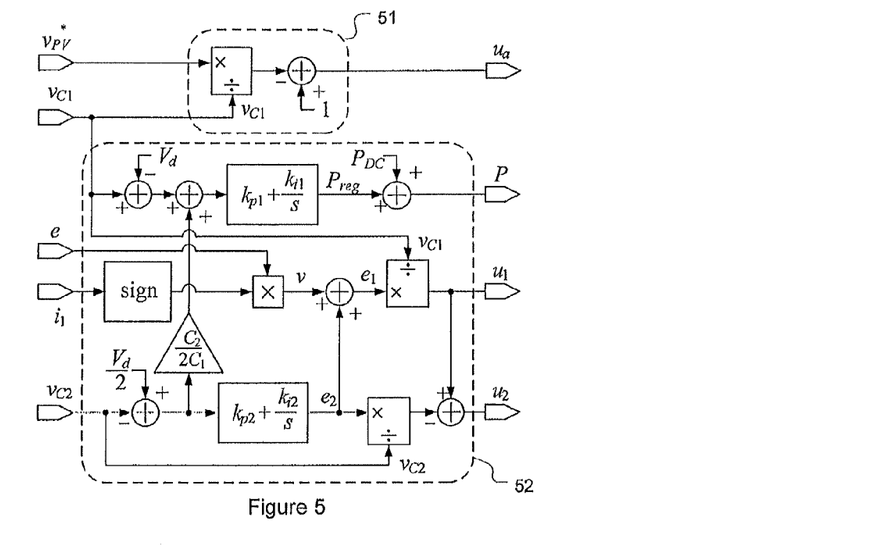
FIG. 5 illustrates a simplified block diagram of a boost controller and a buck controller suitable for the exemplary embodiment of FIG. 2.

FIG. 5 illustrates a simplified block diagram of a boost controller 51 and a buck controller 52 suitable for the exemplary embodiment of FIG. 2. In FIG. 2, the boost converter 22 includes a switching device $Q_a$. Controlling a boost converter input voltage can, thus, be performed by controlling a duty cycle of the switching device $Q_a$. In FIG. 5, controlling the duty cycle is performed on the basis of the boost converter output voltage and a boost converter input voltage reference as disclosed in Equation (34). The boost controller 51 in FIG. 5 may, for instance, regulate the PV voltage $v_{C1}$ towards the reference $v_{PV}^*$ imposed by an MPPT.

The buck controller 52 regulates voltages $v_{C1}$ and $v_{C2}$. The two capacitors also cause an issue of balancing the voltages of the capacitors. The balancing of capacitors for boost and buck-boost multilevel DC-DC converters was discussed in Ref. [9]. The issue of balancing capacitor voltages issue for other multicell converters was also discussed in Ref. [10]. Different three-level DC-DC converters were studied in Ref. [11], where also feed-forward control is proposed to equalize the capacitor voltages, in addition to usual feedback control. In Ref. [12] the authors presented an original modelling and active control for flying capacitor multi-cell converters.

In FIG. 5, the buck controller 52 determines a power reference P by first forming a first capacitor voltage reference $V_d$ and a second capacitor voltage reference $V_d/2$. A first capacitor voltage $v_{C1}$ representing the boost converter 22 output voltage and a second capacitor voltage $v_{C2}$ are then determined, and a capacitor voltage regulating control term $P_{reg}$ is formed on the basis of the capacitor voltage references $V_d$ and $V_d/2$ and the determined capacitor voltages $v_{C1}$ and $V_{C2}$. The power reference P is then determined on the basis of the sum of the capacitor voltage regulating power term $P_{reg}$ and the input power $P_{DC}$ of the boost converter.

The power reference P can be used for producing a control reference e, for instance, by using a controller subsystem as disclosed in FIG. 4.

In the buck controller 52 of FIG. 5, the buck converter output voltage v is controlled on the basis of the control reference e and the sign of the converter-side current $i_1$. In order to balance the capacitor voltages, the buck controller 52 includes formation of two voltage balancing terms $e_1$ and $e_2$.

First, a second capacitor voltage balancing control term $e_2$ is formed on the basis of the second capacitor voltage reference $V_d/2$ and the second capacitor voltage $v_{C2}$. In the buck controller 52, a PI controller according to Equations (30) is used for forming the second capacitor voltage balancing control term $e_2$.

A first capacitor voltage balancing control term $e_1$ is then formed on the basis of the second capacitor voltage balancing control term $e_2$, the sign of the converter-side current $i_1$ of the CL filter 25 in FIG. 2, and the control reference e.

Finally, in the buck controller 52 of FIG. 5, a duty cycle $u_1$ of the buck converter first switching device $Q_1$ is controlled on the basis of the first capacitor voltage balancing control term $e_1$ and the first capacitor voltage $v_{C1}$. A duty cycle $u_2$ of the buck converter second switching $Q_2$ device is controlled on the basis of the second capacitor voltage balancing control term $e_2$, the second capacitor voltage $v_{C2}$ and the duty cycle $u_1$.

The exemplary embodiment of FIG. 5 is able to regulate and balance the voltage of the capacitors $Q_1$ and $Q_2$ in the three-level buck converter 23 of FIG. 2. It can also guarantee tracking of the current reference in spite of the existence of harmonic distortion in the grid voltage $v_s$.

Figure 6:
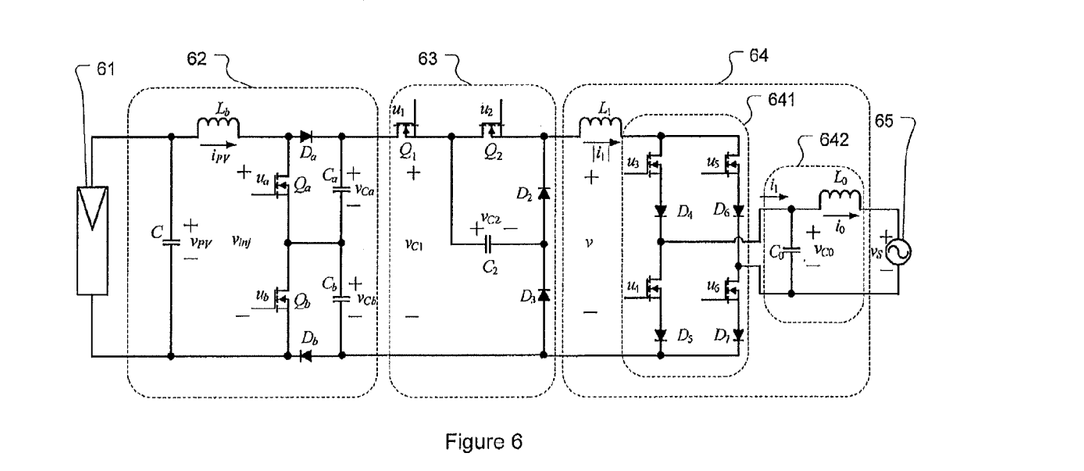
FIG. 6 illustrates a configuration of a converter according to an exemplary embodiment of the present disclosure.

FIG. 6 illustrates another exemplary converter configuration 60. In FIG. 6, a PV string 61 is connected to the input of a boost converter 62. Unlike in the converter 20 of FIG. 2, here a three-level boost converter 62 is used instead of the single two-level boost converter. The boost converter 62 includes a first capacitor $C_a$, a second capacitor $C_b$, a boost converter first switching device $Q_a$ and a boost converter second switching device $Q_b$.

The output of the boost converter 62 is connected to the input of a three-level buck converter 63. The capacitor at the input of the buck converter is omitted.

The output of the buck converter 63 is connected to the input of a current source inverter 64. The current source inverter 64 includes an inverter bridge 641. The current source inverter 64 also includes a CL filter 642 at the output of the current source inverter 64. The current source inverter output is connected to a grid 65.

The only new control issue that arises with respect to the exemplary embodiment of FIG. 5 is the balancing of voltages $v_{Ca}$ and $v_{Cb}$ of the capacitors $C_a$ and $C_b$. Otherwise the controller can be the same as in the circuit of FIGS. 4 and 5.

To better understand the proposed controller, a model of the three-level boost converter is presented as follows:

$$L_b \dot{i}_{PV} = v_{PV} - v_{inj},$$

$$C_a \dot{v}_{Ca} = (1-u_a)i_{PV} - u_1|i_1|,$$

$$C_b \dot{v}_{Cb} = (1-u_b)i_{PV} - u_1|i_1|,$$

$$v_{inj} = [(1-u_a)v_{Ca} + (1-u_b)v_{Cb}], \quad (37)$$

where $0 \le u_a \le 1$ and $0 \le u_b \le 1$ are the duty cycles of the three-level boost converter.

Assuming that $C_a = C_b = 2C_1$, and considering that the sum and the difference of the capacitor voltages are the new description variables, the following expressions can be formed:

$$L_b \dot{i}_{PV} = v_{PV} - v_{inj},$$

$$C_1(\dot{v}_{Ca} + \dot{v}_{Cb}) = \tfrac{1}{2}[(1-u_a)+(1-u_b)]i_{PV} - u_1|i_1|,$$

$$C_1(\dot{v}_{Ca} - \dot{v}_{Cb}) = \tfrac{1}{2}[(1-u_a)-(1-u_b)]i_{PV}. \quad (38)$$

In order to facilitate the controller design and to reduce the notation, the following transformations can be used:

$$x_1 = v_{Ca} + v_{Cb},$$

$$x_2 = V_{Ca} - v_{Cb},$$

$$\delta = u_b - u_a. \quad (39)$$

From the last expressions in Equations (37) and (39), the duty cycles $u_a$ and $u_b$ for the boost converter first switching device $Q_a$ and the boost converter second switching device $Q_b$, respectively, can be recovered as follows:

$$u_a = 1 - \frac{v_{inj} + v_{Cb}\delta}{v_{Ca} + v_{Cb}}, \quad (40)$$

$$u_b = 1 - \frac{v_{inj} + v_{Ca}\delta}{v_{Ca} + v_{Cb}}.$$

Out of transformation (39), the model can be written as $$L_b \dot{i}_{PV} = v_{PV} - v_{inj}, \quad (41)$$

$$C_1 \dot{x}_1 = \frac{1}{x_1}i_{PV}v_{inj} - \frac{x_2}{x_1}i_{PV}\delta - u_1|i_1|,$$

$$C_1 \dot{x}_2 = \frac{1}{2}i_{PV}\delta.$$

The model can be further simplified by considering the following transformation $$z_1 = \frac{x_1^2}{2}$$

and $e_1 = x_1 u_1$, which yields $$L_b \dot{i}_{PV} = v_{PV} - v_{inj},$$

$$C_1 \dot{z}_1 = i_{PV} v_{inj} - x_2 i_{PV} \delta - e_1 |i_1|,$$

$$C_1 \dot{x}_2 = \frac{1}{2} i_{PV} \delta. \tag{42}$$

The second expression in Equations (42) coincides with the first expression of Equations (11), except for an extra term $x_2 i_{PV} \delta$, and thus, this expression belongs also to the description of the buck converter dynamics. Therefore, a similar procedure (as the one followed in the single two-level boost converter) can now be followed to achieve regulation and balancing of the capacitor voltage $v_{C2}$ and the sum of capacitor voltages $x_1 = v_{Ca} + v_{Cb}$. Roughly speaking, voltage $v_{C1}$ used previously in the single two-level boost converter is now replaced by the sum $x_1$ of voltages.

Thus, the only remaining objective involves balancing the voltage of capacitors $C_a$ and $C_b$, or equivalently, in reducing a voltage difference $x_2 = v_{Ca} - v_{Cb}$ to zero.

Based on the third expression of Equations (42), the following controller $\delta$ is designed to make $x_2 \to 0$ $$\delta = -k_{p3} x_2 - k_{i3} \xi_3,$$

$$\dot{\xi}_3 = x_2. \tag{43}$$

$i_{PV} \geq 0$ and bounded by construction, and, therefore, stability can be guaranteed.

Finally, the following controller for the three-level boost converter can be formed on the basis of Equations (40) by forcing $v_{inj} = v_{PV}^*$:

$$u_a = 1 - \frac{v_{PV}^* + v_{CB} \delta}{v_{Ca} + v_{Cb}}, \tag{44}$$

$$u_b = 1 - \frac{v_{PV}^* + v_{Ca} \delta}{v_{Ca} + v_{Cb}}.$$

where $v_{PV}^*$ is fixed by the boost converter input voltage reference, and $\delta$ is given by Equations (43). $v_{PV}^*$ can, for instance, be fixed by a suitable MPPT scheme.

Figure 7:
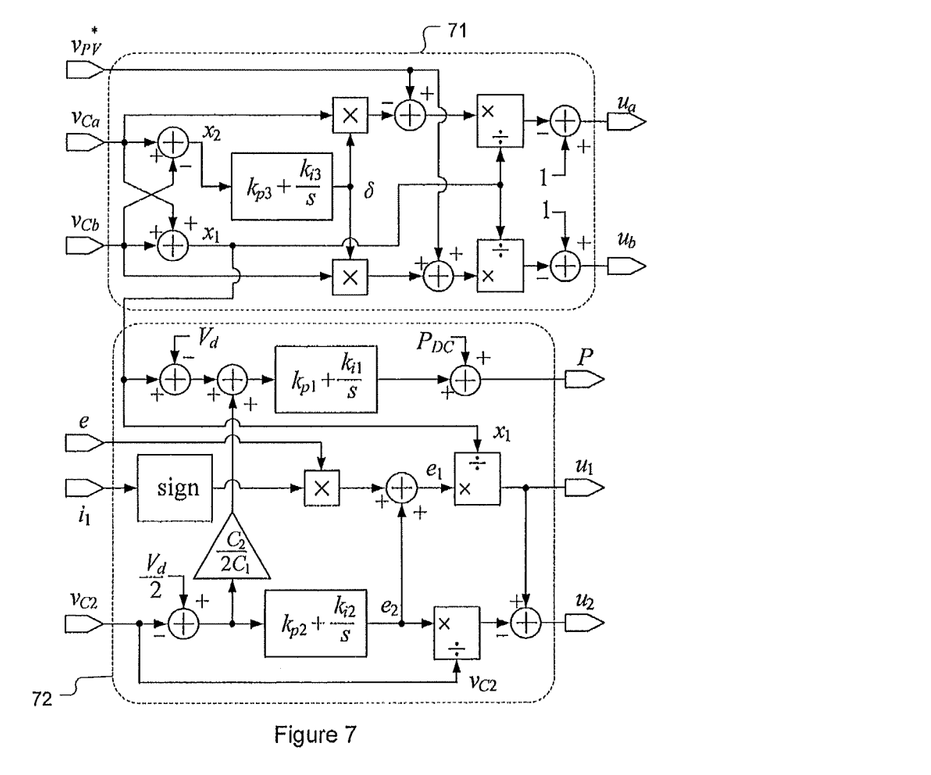
FIG. 7 illustrates a simplified block diagram of a boost controller and a buck controller suitable for the exemplary embodiment of FIG. 6.

FIG. 7 illustrates a simplified block diagram of a boost controller 71 and a buck controller 72 suitable for the exemplary embodiment of FIG. 6. The buck controller 71 includes regulation of the voltage $x_1$ and balancing of the voltages $x_1$ and $v_{C2}$. The buck controller 72 coincides with the buck controller 52 in FIG. 5, except for the use of $x_1$ in the place of $v_{C1}$. In FIGS. 6 and 7, $C_a = C_b = 2C_1$.

In the boost controller 71 of FIG. 7, controlling a boost converter 62 (of FIG. 6) input voltage is performed by controlling duty cycles of the switching devices in the boost converter 62 on the basis of the boost converter input voltage reference $v_{PV}^*$, and the voltages $v_{Ca}$ and $v_{Cb}$ of the boost converter capacitors. The boost controller 71 (in FIG. 7) may regulate the boost converter 62 (in FIG. 6) input voltage towards, for instance, a reference imposed by the MPPT.

The buck controller 72 is able to regulate and balance the voltage of the capacitors involved in the three-level buck converter 63 in FIG. 6. The buck controller 72 can also guarantee tracking of the current reference in spite of the existence of harmonic distortion in the grid voltage. At the same time, the boost controller 71 of FIG. 7 is able to regulate and balance the two capacitors used for generating the three levels in the boost converter 62.

Numerical tests were also performed in order to assess the performance of the disclosed solution. The simulations considered a PV string and a conventional P&O MPPT method to test the overall system functioning.

For a simulation test, the single-phase PV converter grid-connected through a CL filter of FIG. 2 was used. This system was designed using the following parameters: $L_b$=1 mH, C=1 µF, $L_1$=2 mH, $L_0$=833 µH, $C_0$=10 µF, $C_1$=2200 µF and $C_2$=220 µF. The grid voltage characteristics are shown in Table 1.

TABLE 1

Grid voltage harmonic component characteristics used in the simulation.

| Harmonic No. | Amplitude [$V_{RMS}$] | Phase [deg] |
| --- | --- | --- |
| 1 | 230 | 0.0 |
| 3 | 50 | 14.3 |
| 5 | 25 | 8.6 |
| 7 | 15 | 5.7 |

The following parameters were selected for the active damping part of the current controller: $R_1$=15, $R_2$=1, $R_0$=1, following tuning guidelines proposed in [13].

For the harmonic compensation part, the following values were selected: $\gamma_1$=300, $\gamma_3$=200, $\gamma_5$=200, $\gamma_7$=200. Instead of an adaptive scheme or a PLL, an estimator F-QSG as disclosed in FIG. 3 with a known $\omega_0$, was used, where the only parameter was tuned to $\lambda_1$=100. For the reduced order observer, values $\alpha_1$=0.5 and $\alpha_2$=0.1 were selected.

The following parameters were selected for the buck controller: $k_{p2}$=30, $k_{i2}$=600, $k_{p1}$=7.5, $k_{i1}$=50. A conventional P&O was used for adjusting the boost converter input voltage reference. The MPPT used an increment of 2 V and a sampling time of 0.0025 s.

Figure 8:
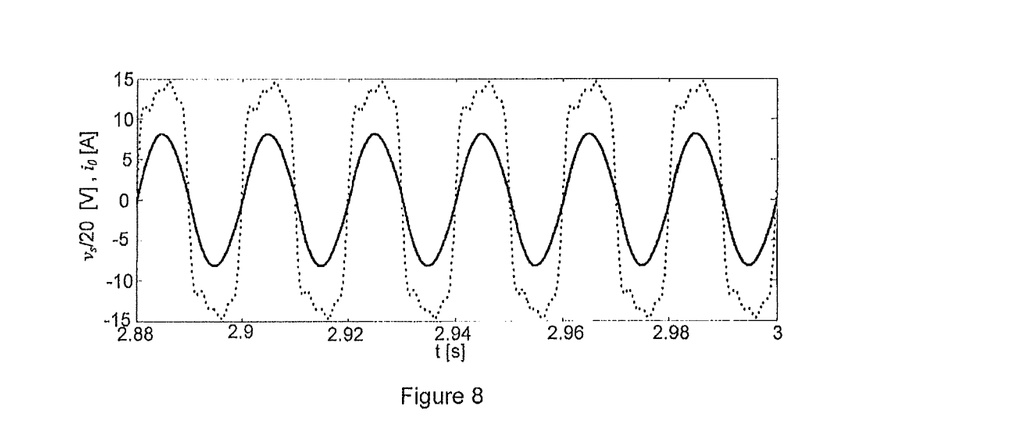
FIG. 8 illustrates a steady state response of compensated grid-side current and distorted grid voltage according to an exemplary embodiment of the present disclosure.

FIG. 8 illustrates a steady state response (in solid line) of compensated grid-side current $i_0$, and distorted grid voltage $v_s$ (in dashed line). In the steady state, the grid-side current $i_0$ tracked a pure sinusoidal signal in phase with the grid voltage $v_s$, despite of the high distortion on the grid voltage.

Figure 9A:
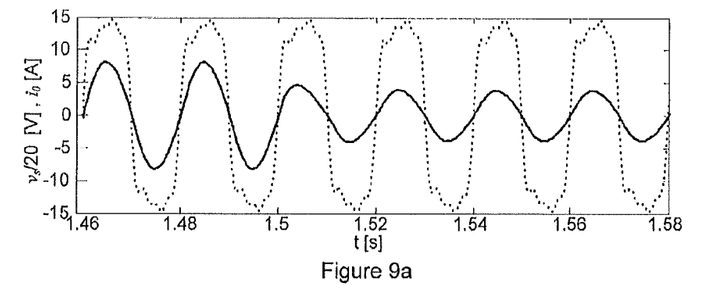
FIGS. 9a and 9b illustrate transients during step changes in irradiation according to an exemplary embodiment of the present disclosure.
Figure 9B:
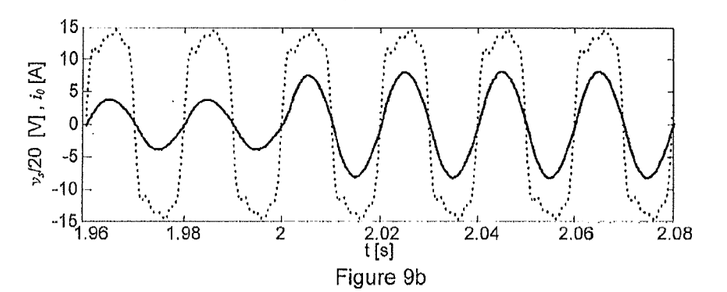

FIGS. 9a and 9b illustrate transients during step changes in irradiation. FIG. 9a illustrates a transient during a step change in irradiation from 1000 W/m² to 500 W/m². FIG. 9b illustrates a transient during a step change in irradiation from 500 W/m² to 1000 W/m². Compensated grid-side current $i_0$ is indicated by a solid line and the distorted grid voltage $v_s$ is indicated by a dashed line. FIGS. 9a and 9b show that the shape of the grid-side current remains sinusoidal, after an almost negligible transient, during step changes in the grid irradiation from 1000 W/m² to 500 W/m² and back.

Figure 10A:
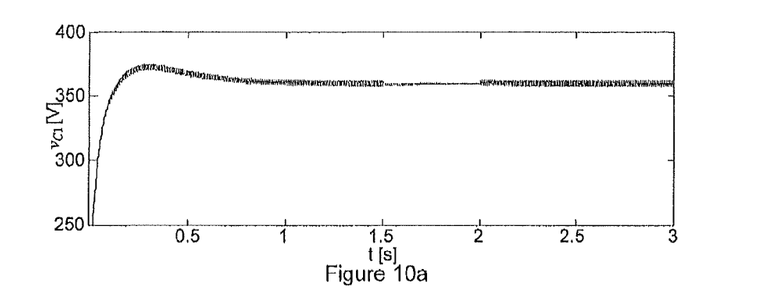
FIGS. 10a and 10b illustrate transient responses of voltage $v_{C1}$ and voltage $v_{C2}$ during start-up and during irradiation changes according to an exemplary embodiment of the present disclosure.
Figure 10B:
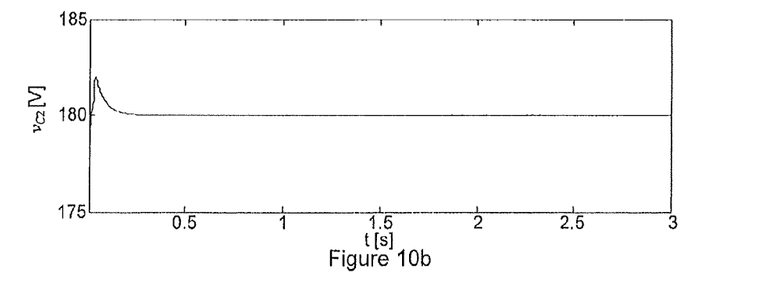

FIGS. 10a and 10b illustrate transient responses of voltage $v_{C1}$ and voltage $v_{C2}$, respectively, during start-up and during irradiation changes from 1000 W/m² to 500 W/m² at t=1.5 s, and back at t=2 s. After a reasonable transient both voltages $v_{C1}$ and $v_{C2}$ reached their references fixed to 360 V and 180 V, respectively. A ripple in capacitor voltage $v_{C2}$ was almost imperceptible when compared to a ripple in $v_{C1}$.

Figure 11A:
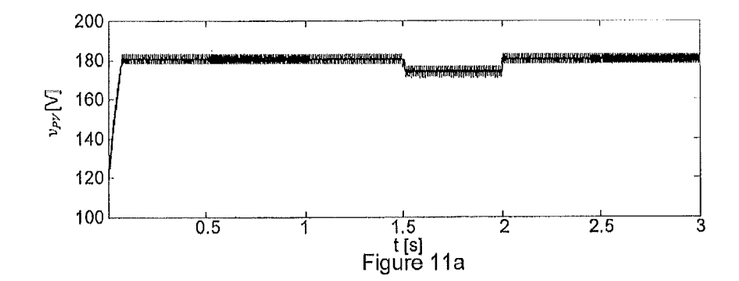
FIGS. 11a and 11b illustrate transient responses of PV voltage $v_{PV}$ and PV current $i_{PV}$ during start-up and during irradiation changes according to an exemplary embodiment of the present disclosure.
Figure 11B:
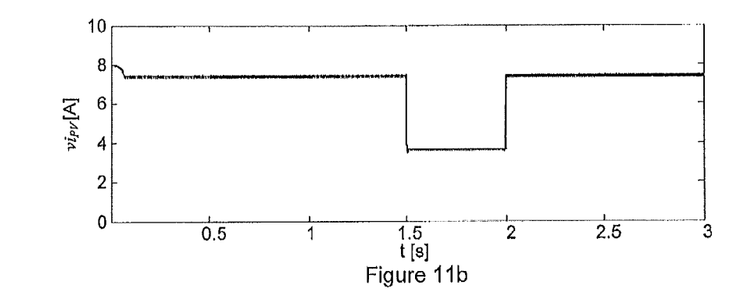

FIGS. 11a and 11b illustrate transient responses of PV voltage $v_{PV}$ and PV current $i_{PV}$, respectively, during start-up and during irradiation changes from 1000 W/m² to 500 W/m² at t=1.5 s, and back at t=2 s. In order to adapt to changes in irradiation, the voltage on the PV was readjusted by the MPPT scheme, so the MPP was followed every time.

Figure 12A:
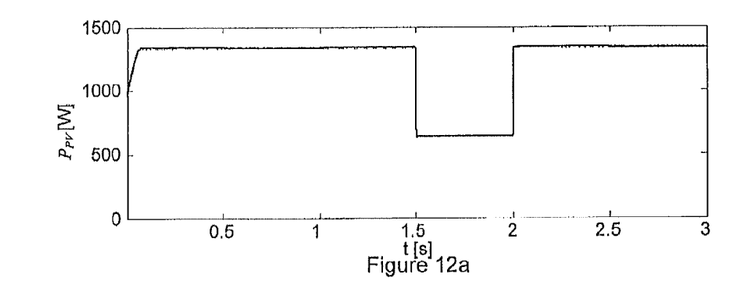
FIGS. 12a and 12b illustrate transient responses of PV power $P_{PV}$, and calculated power P during start-up and during irradiation changes according to an exemplary embodiment of the present disclosure.
Figure 12B:
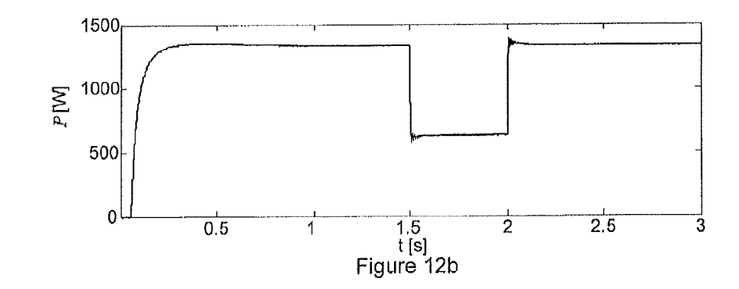

FIGS. 12a and 12b illustrate transient responses of PV power $P_{PV}$, and calculated power P, respectively, during start-up and during irradiation changes from 1000 W/m² to 500 W/m² at t=1.5 s, and back at t=2 s. The PV power was calculated using equation $P_{PV}=i_{PV}v_{PV}$. The power P amplitude was calculated on the basis of the grid-side current reference $i_0^*$ according to Equation (6). After reasonable transients, the two curves got almost the same value. Before using the power P in Equation (6), a notch filter tuned at the $2^{nd}$ harmonic was applied to P in order to get rid of a ripple present in P. Otherwise, unwanted harmonic distortion would have been introduced in the grid-side current $i_O$.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCES

[1] M. Lindgren and J. Svensson, "Control of a voltage-source converter connected to the grid through an LCL filter—Application to active filtering," in *Proc. IEEE Power Specialists Conference PESC'98*, Fukuoka, Japan, 1998, pp. 229-235.

[2] S. Baekof-Kjaer, G. K. Andersen, C. Klumpner, F. Blaabjerg, "Control aspects of an LCL grid-connected green power inverter," in *Proc. Nordic Workshop on Pow. and Ind. Electr. NORPIE'02*, 12-14 Aug. 2002, pp. 1-7.

[3] E. Twining, and D. G. Holmes, "Grid current regulation of a three-phase voltage source inverter with an LCL input filter," *IEEE Trans. on Power Electr.*, Vol. 18(3), pp. 888-895, May 2003.

[4] R. Teodorescu, F. Blaabjerg, U. Borup, M. Liserre, "A new control structure for grid-connected LCL PV inverters with zero steady-state error and selective harmonic compensation," in *Proc. IEEE Applied Power Electronics Conference APEC'04*, 2004, Vol. 1, pp. 580-586.

[5] A. Papavasiliou, S. A. Papathanassiou, S. N. Manias and G. Demetriadis, "Current control of a voltage source inverter connected to the grid via LCL filter," in *Proc. IEEE Power Electronics Specialists Conf. PESC'07*, 17-21 Jun., 2007, pp. 2379-2384.

[6] L. A. Serpa, S. Ponnaluri, P. M. Barbosa and J. W. Kolar, "A modified direct power control strategy allowing the connection of three-phase inverters to the grid through LCL filters," *IEEE Trans. on Ind. Appl.*, Vol 43(5), pp. 1388-1400, September/October 2007.

[7] A. Coccia, G. Escobar, L. A. Serpa, M. Paakkinen, S. Pettersson, "Three-stage multilevel DC to AC converter", European Patent Application EP 2270971 A1.

[8] R. Gonzalez, J. Coloma, L. Marroyo, J. Lopez and P. Sanchis, "Single phase inverter circuit for conditioning and converting DC electrical energy into AC electrical energy," Patent PCT No. WO 2008/015298 A1, 7 Feb. 2008.

[9] R. Stala, "The switch-mode flying-capacitor DCDC converters with improved natural balancing," *IEEE Transactions on Industrial Electronics*, Vol. 57(4), pp. 1369-1382, April 2010.

[10] R. Stala, S. Pirog, M. Baszynski, A. Mondzik, A. Penczek, J. Czekonski, and S. Gasiorek, "Results of investigation of multicell converters with balancing circuit—Part I," *IEEE Transactions on Industrial Electronics*, Vol. 56(7), pp. 2610 2619, July 2009.

[11] X. Ruan, B. Li, Q. H. Chen, S. C. Tan and C. K. Tse, "Fundamental considerations of three-level DCDC converters: topologies, analyses, and control," *IEEE Transactions on Circuits and Systems-I: Regular Papers*, Vol. 55(11), pp. 3733-3743, December 2008.

[12] G. Gateau, M. Fadel, P. Maussion, R. Bensaid, and T. A. Meynard, "Multicell converters: active control and observation of flying-capacitor voltages," *IEEE Transactions on Industrial Electronics*, Vol. 49(5), pp. 998-1008, October 2002.

[13] A. Coccia, G. Escobar, L. A. Serpa, M. Paakkinen, S. Pettersson, "Control method for single-phase grid-connected LCL inverter", European Patent Application EP 2362515 A1.

[14] G. Escobar, L. A. Serpa, M. Paakkinen, A. Coccia, S. Pettersson, "Method of and apparatus for determining fundamental frequency component of the grid voltage", European Patent Application EP 2354800 A1.

What is claimed is:

1. A method for controlling a grid-connected converter including a boost converter, a buck converter, and a current source inverter having an output CL filter, wherein an input of the buck converter is connected to an output of the boost converter, and an input of the current source inverter is connected to an output of the buck converter, the method comprising:
   controlling an input voltage of the boost converter;
   controlling an output voltage of the boost converter through control of an output voltage (v) of the buck converter; and
   controlling the current source inverter to produce an AC current from the buck converter output voltage (v),
   wherein the controlling of the boost converter output voltage comprises:
   determining a power reference (P) on the basis of an input power ($P_{DC}$) of the boost converter and the boost converter output voltage;
   determining a grid voltage ($v_s$);
   determining a converter-side current ($i_1$) of the CL filter;
   forming a damping injection term ($v_{ADI}$) for damping a resonance of the current source inverter by using an active damping injection mechanism;
   forming a harmonic distortion term ($\hat{\phi}$) for compensating harmonic distortion of the grid voltage by using a harmonic compensation mechanism;
   determining a control reference (e) on the basis of the power reference (P), the grid voltage ($v_s$), the damping injection term ($v_{ADI}$) and the harmonic distortion term ($\hat{\phi}$); and
   controlling the buck converter output voltage (v) on the basis of the control reference (e) and the sign of the converter-side current ($i_1$).

2. A method according to claim 1, wherein the buck converter is a three-level output voltage buck converter which comprises, in order to produce three voltage levels:
   a first capacitor ($C_1$) and a second capacitor ($C_2$); and
   a first switching device ($Q_1$) and a second switching device ($Q_2$),
   wherein the determining of the power reference (P) comprises:
   forming a first capacitor voltage reference ($V_d$) and a second capacitor voltage reference ($V_d/2$);

determining a first capacitor voltage ($v_{C1}$) representing the boost converter output voltage and a second capacitor voltage ($v_{C2}$);

forming a capacitor voltage regulating control term ($P_{reg}$) on the basis of the capacitor voltage references ($V_d$, $V_d/2$) and the determined first and second capacitor voltages ($v_{C1}$, $v_{C2}$);

determining the power reference (I) on the basis of a sum of the capacitor voltage regulating power term ($P_{reg}$) and the input power ($P_{DC}$) of the boost converter, and wherein the controlling of the buck converter output voltage (v) comprises:

forming a second capacitor voltage balancing control term ($e_2$) on the basis of the second capacitor voltage reference ($V_d/2$) and the second capacitor voltage ($v_{C2}$);

forming a first capacitor voltage balancing control term ($e_1$) on the basis of the second capacitor voltage balancing control term ($e_2$), the sign of the converter-side current ($i_1$) of the CL filter, and the control reference (e);

controlling a duty cycle ($u_1$) of the buck converter first switching device ($Q_1$) on the basis of the first capacitor voltage balancing control term ($e_1$) and the first capacitor voltage ($v_{C1}$); and controlling a duty cycle ($u_2$) of the buck converter second switching device ($Q_2$) on the basis of the second capacitor voltage balancing control term ($e_2$), the second capacitor voltage ($V_{C2}$) and the duty cycle ($u_1$) of the first switching device.

3. A method according to claim 2, comprising:

measuring at least one signal in a group of CL filter signals including a grid-side current ($i_0$), a converter-side current ($i_1$), and a capacitor voltage ($v_{C0}$), wherein the determining of the control reference comprises:

determining the fundamental wave component ($\hat{v}_{S,1}$) of the grid voltage ($v_s$);

forming a grid-side current reference ($i_0^*$) and a converter-side current reference ($i_1^*$) for the CL filter on the basis of the power reference and the fundamental wave component ($\hat{v}_{S,1}$);

forming a capacitor voltage reference ($v_{C0}^*$) for the CL filter on the basis of the fundamental wave component ($\hat{v}_{S,1}$);

forming estimates for the non-measured signals in the group of signals;

forming a grid-side current difference term ($\tilde{i}_0$), a converter-side current difference term ($\tilde{i}_1$) and a capacitor voltage difference term ($\tilde{v}_{C0}$) from the differences between references and at least one of the measured and estimated values of the group of signals;

forming the damping injection term on the basis of the grid-side current difference term ($\tilde{i}_0$), the converter-side current difference term ($\tilde{i}_1$) and the capacitor voltage difference term ($\tilde{v}_{C0}$);

forming an estimate of the harmonic distortion term ($\hat{\phi}$) by using the grid-side current difference term ($\tilde{i}_0$); and determining the control reference on the basis of the grid voltage, formed damping injection term and formed estimate of the harmonic distortion term ($\hat{\phi}$).

4. A method as claimed in claim 3, wherein the fundamental frequency ($\omega_0$) of the grid voltage is known, and estimating the fundamental wave component ($\hat{v}_{S,1}$) of the grid voltage comprises:

determining a value for a square phase signal ($\hat{\phi}_{S,1}$) by integrating the product of the opposite value of fundamental wave component of the grid voltage ($\hat{v}_{S,1}$) and the fundamental frequency of the grid voltage ($\omega_0$);

determining the difference ($\tilde{v}_s$) between the grid voltage and the fundamental wave component of the grid voltage ($\hat{v}_{S,1}$);

adding the product of the square phase signal ($\hat{\phi}_{S,1}$) and the fundamental frequency of the grid voltage ($\omega_0$) to the product of the difference ($\tilde{v}_s$) and the estimation gain ($\lambda_1$); and determining the value of the fundamental wave component of the grid voltage ($\hat{v}_{S,1}$) by integrating the sum of the addition.

5. A method as claimed in claim 4, wherein the forming of the estimate of the harmonic distortion term ($\hat{\phi}$) comprises a summation of k harmonic components ($\hat{\phi}_1$ to $\hat{\phi}_k$).

6. A method according to claim 1, wherein the boost converter comprises a switching device ($Q_a$), and wherein the controlling of the boost converter input voltage comprises:

controlling a duty cycle of the switching device ($Q_a$) on the basis of the boost converter output voltage and a boost converter input voltage reference ($v_{PV}^*$).

7. A method according to claim 6, comprising:

measuring at least one signal in a group of CL filter signals including a grid-side current ($i_0$), a converter-side current ($i_1$), and a capacitor voltage ($v_{C0}$), wherein the determining of the control reference comprises:

determining the fundamental wave component ($\hat{v}_{S,1}$) of the grid voltage ($v_s$);

forming a grid-side current reference ($i_0^*$) and a converter-side current reference ($i_1^*$) for the CL filter on the basis of the power reference and the fundamental wave component ($\hat{v}_{S,1}$);

forming a capacitor voltage reference ($v_{C0}^*$) for the CL filter on the basis of the fundamental wave component ($\hat{v}_{S,1}$);

forming estimates for the non-measured signals in the group of signals;

forming a grid-side current difference term ($\tilde{i}_0$), a converter-side current difference term ($\tilde{i}_1$) and a capacitor voltage difference term ($\tilde{v}_{C0}$) from the differences between references and at least one of the measured and estimated values of the group of signals;

forming the damping injection term on the basis of the grid-side current difference term ($\tilde{i}_0$), the converter-side current difference term ($\tilde{i}_1$) and the capacitor voltage difference term ($\tilde{v}_{C0}$);

forming an estimate of the harmonic distortion term ($\hat{\phi}$) by using the grid-side current difference term ($\tilde{i}_0$); and determining the control reference on the basis of the grid voltage, formed damping injection term and formed estimate of the harmonic distortion term ($\hat{\phi}$).

8. A method as claimed in claim 7, wherein the fundamental frequency ($\omega_0$) of the grid voltage is known, and estimating the fundamental wave component ($\hat{v}_{S,1}$) of the grid voltage comprises:

determining a value for a square phase signal ($\hat{\phi}_{S,1}$) by integrating the product of the opposite value of fundamental wave component of the grid voltage ($\hat{v}_{S,1}$) and the fundamental frequency of the grid voltage ($\omega_0$);

determining the difference ($\tilde{v}_s$) between the grid voltage and the fundamental wave component of the grid voltage ($\hat{v}_{S,1}$);

adding the product of the square phase signal ($\hat{\phi}_{S,1}$) and the fundamental frequency of the grid voltage ($\omega_0$) to the product of the difference ($\tilde{v}_s$) and the estimation gain ($\lambda_1$); and determining the value of the fundamental wave component of the grid voltage ($\hat{v}_{S,1}$) by integrating the sum of the addition.

9. A method as claimed in claim 8, wherein the forming of the estimate of the harmonic distortion term ($\hat{\phi}$) comprises a summation of k harmonic components ($\hat{\phi}_1$ to $\hat{\phi}_k$).

10. A method according to claim 1, wherein the boost converter is a three-level boost converter comprising:
a first boost converter capacitor ($C_a$) and a second boost converter capacitor ($C_b$);
a boost converter first switching device ($Q_a$) and a boost converter second switching device ($Q_b$), and
wherein the method comprises:
controlling duty cycles of the switching devices ($Q_a$, $Q_b$) of the boost converter (62) on the basis of the boost converter input voltage, a boost converter input voltage reference ($v_{PV}^*$), and voltages ($v_{Ca}$, $v_{Cb}$) of the boost converter capacitors ($C_a$, $C_b$).

11. A method according to claim 10, comprising:
measuring at least one signal in a group of CL filter signals including a grid-side current ($i_0$), a converter-side current ($i_1$), and a capacitor voltage ($v_{C0}$),
wherein the determining of the control reference comprises:
determining the fundamental wave component ($\hat{v}_{S,1}$) of the grid voltage ($v_s$);
forming a grid-side current reference ($i_0^*$) and a converter-side current reference ($i_1^*$) for the CL filter on the basis of the power reference and the fundamental wave component ($\hat{v}_{S,1}$);
forming a capacitor voltage reference ($v_{C0}^*$) for the CL filter on the basis of the fundamental wave component ($\hat{v}_{S,1}$);
forming estimates for the non-measured signals in the group of signals;
forming a grid-side current difference term ($\tilde{i}_0$), a converter-side current difference term ($\tilde{i}_1$) and a capacitor voltage difference term ($\tilde{v}_{C0}$) from the differences between references and at least one of the measured and estimated values of the group of signals;
forming the damping injection term on the basis of the grid-side current difference term ($\tilde{i}_0$), the converter-side current difference term ($\tilde{i}_1$) and the capacitor voltage difference term ($\tilde{v}_{C0}$);
forming an estimate of the harmonic distortion term ($\hat{\phi}$) by using the grid-side current difference term ($\tilde{i}_0$); and
determining the control reference on the basis of the grid voltage, formed damping injection term and formed estimate of the harmonic distortion term ($\hat{\phi}$).

12. A method as claimed in claim 11, wherein the fundamental frequency ($\omega_0$) of the grid voltage is known, and estimating the fundamental wave component ($\hat{v}_{S,1}$) of the grid voltage comprises:
determining a value for a square phase signal ($\hat{\phi}_{S,1}$) by integrating the product of the opposite value of fundamental wave component of the grid voltage ($\hat{v}_{S,1}$) and the fundamental frequency of the grid voltage ($\omega_0$);
determining the difference ($\tilde{v}_S$) between the grid voltage and the fundamental wave component of the grid voltage ($\hat{v}_{S,1}$);
adding the product of the square phase signal ($\hat{\phi}_{S,1}$) and the fundamental frequency of the grid voltage ($\omega_0$) to the product of the difference ($\tilde{v}_S$) and the estimation gain ($\lambda_1$); and
determining the value of the fundamental wave component of the grid voltage ($\hat{v}_{S,1}$) by integrating the sum of the addition.

13. A method as claimed in claim 12, wherein the forming of the estimate of the harmonic distortion term ($\hat{\phi}$) comprises a summation of k harmonic components ($\hat{\phi}_1$ to $\hat{\phi}_k$).

14. A method according to claim 1, comprising:
measuring at least one signal in a group of CL filter signals including a grid-side current ($i_0$), a converter-side current ($i_1$), and a capacitor voltage ($v_{C0}$),
wherein the determining of the control reference comprises:
determining the fundamental wave component ($\hat{v}_{S,1}$) of the grid voltage ($v_s$);
forming a grid-side current reference ($i_0^*$) and a converter-side current reference ($i_1^*$) for the CL filter on the basis of the power reference and the fundamental wave component ($\hat{v}_{S,1}$);
forming a capacitor voltage reference ($v_{C0}^*$) for the CL filter on the basis of the fundamental wave component ($\hat{v}_{S,1}$);
forming estimates for the non-measured signals in the group of signals;
forming a grid-side current difference term ($\tilde{i}_0$), a converter-side current difference term ($\tilde{i}_1$) and a capacitor voltage difference term ($\tilde{v}_{C0}$) from the differences between references and at least one of the measured and estimated values of the group of signals;
forming the damping injection term on the basis of the grid-side current difference term ($\tilde{i}_0$), the converter-side current difference term ($\tilde{i}_1$) and the capacitor voltage difference term ($\tilde{v}_{C0}$);
forming an estimate of the harmonic distortion term ($\hat{\phi}$) by using the grid-side current difference term ($\tilde{i}_0$); and
determining the control reference on the basis of the grid voltage, formed damping injection term and formed estimate of the harmonic distortion term ($\hat{\phi}$).

15. A method as claimed in claim 14, wherein the fundamental frequency ($\omega_0$) of the grid voltage is known, and estimating the fundamental wave component ($\hat{v}_{S,1}$) of the grid voltage comprises:
determining a value for a square phase signal ($\hat{\phi}_{S,1}$) by integrating the product of the opposite value of fundamental wave component of the grid voltage ($\hat{v}_{S,1}$) and the fundamental frequency of the grid voltage ($\omega_0$);
determining the difference ($\tilde{v}_S$) between the grid voltage and the fundamental wave component of the grid voltage ($\hat{v}_{S,1}$);
adding the product of the square phase signal ($\hat{\phi}_{S,1}$) and the fundamental frequency of the grid voltage ($\omega_0$) to the product of the difference ($\tilde{v}_S$) and the estimation gain ($\lambda_1$); and
determining the value of the fundamental wave component of the grid voltage ($\hat{v}_{S,1}$) by integrating the sum of the addition.

16. A method as claimed in claim 1, wherein the forming of the estimate of the harmonic distortion term ($\hat{\phi}$) comprises a summation of k harmonic components ($\hat{\phi}_1$ to $\hat{\phi}_k$).

17. An apparatus for controlling a grid-connected converter including a boost converter, a buck converter, and a current source inverter having an output CL filter, wherein an input of the buck converter input is connected to an output of the boost converter output, and an input of the current source inverter is connected to an output of the buck converter output, the apparatus comprising:

means for controlling an input voltage of the boost converter;
means for controlling an output voltage of the boost converter through control of an output voltage of the buck converter; and
means for controlling the current source inverter to produce an AC current from the buck converter output voltage;
wherein the means for controlling the boost converter output voltage:
determines a power reference on the basis of at least an input power of the boost converter, and the boost converter output voltage;
determines a grid voltage;
determines a converter-side current of the CL filter;
forms a damping injection term for damping a resonance of the current source inverter by using an active damping injection mechanism;
forms a harmonic distortion term for compensating harmonic distortion of the grid voltage by using a harmonic compensation mechanism;
determines a control reference on the basis of at least the power reference, the grid voltage, the damping injection term and the harmonic distortion term; and
controls the buck converter output voltage on the basis of the control reference and the sign of the converter-side current.

* * * * *